(12) United States Patent
Kushwah (10) Patent No.: US 8,214,406 B2
(45) Date of Patent: Jul. 3, 2012

(54) BACKUP OF INCREMENTAL METADATA IN BLOCK BASED BACKUP SYSTEMS

(75) Inventor: Ajay Pratap Singh Kushwah, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/962,819

(22) Filed: Dec. 8, 2010

(65) Prior Publication Data

US 2011/0078118 A1   Mar. 31, 2011

Related U.S. Application Data

(63) Continuation of application No. 11/479,317, filed on Jun. 29, 2006, now Pat. No. 7,873,601.

(51) Int. Cl.
*G06F 7/00* (2006.01)

(52) U.S. Cl. ...................................................... 707/797
(58) Field of Classification Search .................. 707/654, 707/707, 797
See application file for complete search history.

(56) References Cited

U.S. PATENT DOCUMENTS

| | | | |
|---|---|---|---|
| 7,334,098 B1 * | 2/2008 | Poston | 711/162 |
| 2007/0112895 A1 * | 5/2007 | Ahrens et al. | 707/204 |
| 2008/0281877 A1 * | 11/2008 | Wayda et al. | 707/204 |

* cited by examiner

*Primary Examiner* — Truong Vo
(74) *Attorney, Agent, or Firm* — Van Pelt, Yi and James LLP (57) ABSTRACT

Performing a backup is disclosed. A changed portion of a file system tree is determined based at least in part on a stored state of the file system tree at a time a prior block based backup of the file system tree was performed. Incremental metadata associated with the changed portion is obtained. The obtained incremental metadata is stored where there is at least some metadata associated with an unchanged portion of the file system tree that is not stored when storing the obtained incremental metadata.

18 Claims, 8 Drawing Sheets

Inode Table — 500

| | File Size | Permissions | File System Metadata Block Location | Data Block Location |
|---|---|---|---|---|
| Inode 1 | | | | |
| Inode 2 | | | | |
| Inode 3 | | | | |
| Inode 4 | | | | |

Changed Block List

BACKUP OF INCREMENTAL METADATA IN BLOCK BASED BACKUP SYSTEMS

CROSS REFERENCE TO OTHER APPLICATIONS

This application is a continuation of co-pending U.S. patent application Ser. No. 11/479,317, entitled BACKUP OF INCREMENTAL METADATA IN BLOCK BASED BACKUP SYSTEMS filed Jun. 29, 2006 which is incorporated herein by reference for all purposes.

BACKGROUND OF THE INVENTION

In some block based backup systems, file system objects (e.g., files, directories, etc.) are backed up by storing data blocks and metadata on backup media. Some block based backup systems achieve faster backup times compared to file based backup systems, particularly for high density file system applications where, for example, tens of millions of files are backed up. At a full backup, all data blocks associated with a file system or portion thereof being backed up are written to backup media and associated metadata is stored. During an incremental backup, only data blocks that have changed since a last backup are written to backup media and typically an incremental backup takes less time than a full backup.

During an incremental backup some current block based backup systems spend most of their time backing up metadata. It would be useful to develop techniques that would reduce the amount of time associated with backing up metadata during an incremental backup.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network. A computer readable storage medium is a non-transitory medium on which computer readable program instructions can be stored (e.g., read-only memory). A computer network is a network in which program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Backing up metadata is disclosed. A changed portion of a file system tree is determined based on the current state of the file system tree and a prior state associated with a prior block based backup of the file system tree. In some embodiments, the prior block based backup is a full backup. In some embodiments, a changed portion is determined by recording changes to blocks on media associated with a device being backed up. For example, in some embodiments write commands that are passed to a disk driver or other media driver (e.g., triggered or initiated by a user or an application) are intercepted or otherwise observed to generate a record of changed blocks. Incremental metadata associated with the changed portion is obtained. In some embodiments, file system metadata blocks (e.g., blocks that are associated with metadata and/or are generated or managed by a file system) are obtained, for example from media associated with a device being backed up. In some embodiments, locations on media associated with file system metadata blocks that have changed are determined and information is obtained from those locations. The obtained incremental metadata is stored without also storing at least some metadata associated with an unchanged portion of the file system tree.

Figure 1:
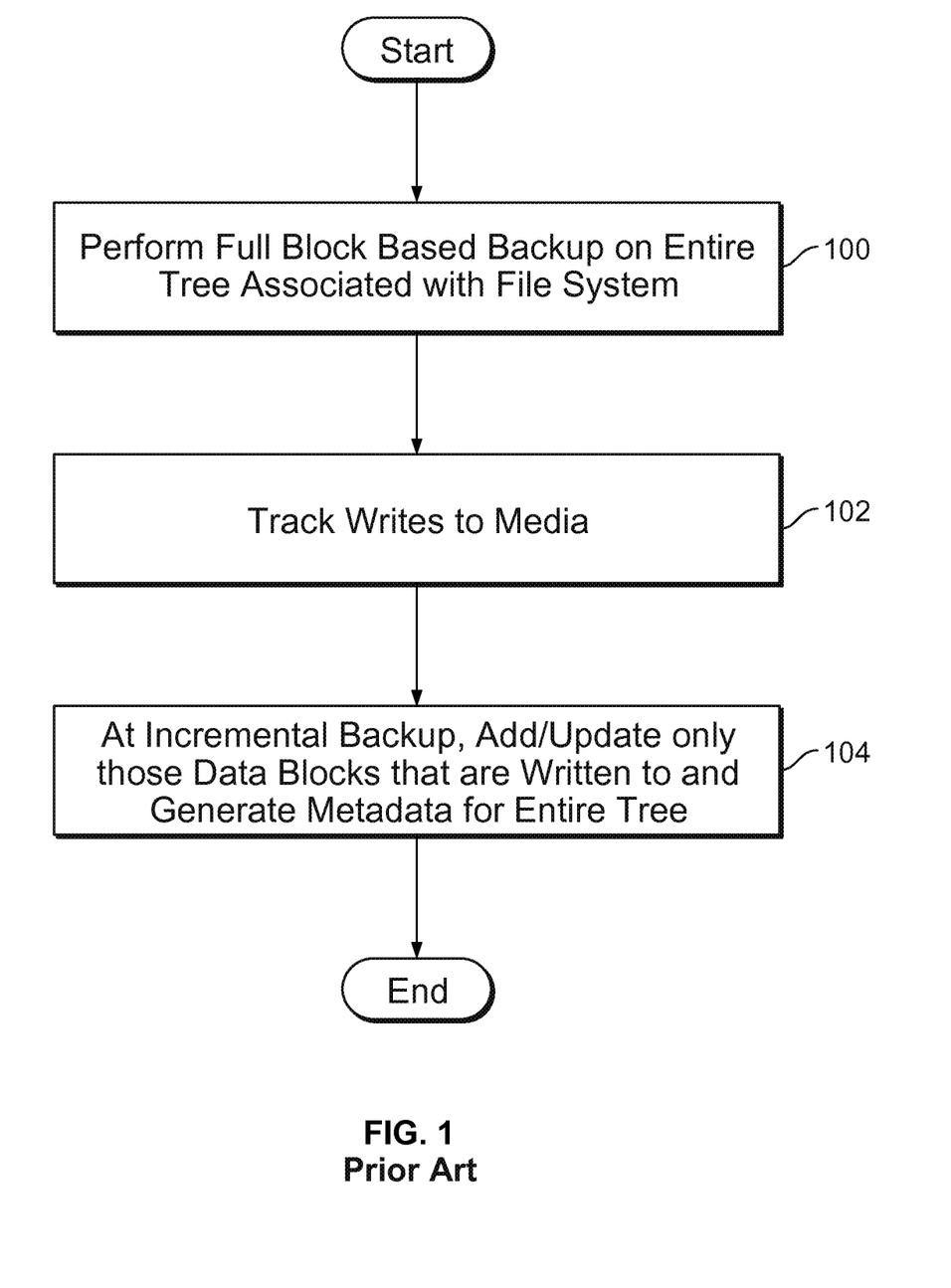
FIG. 1 is a flowchart illustrating an existing process for backing up a file system tree associated with a device being backed up.

FIG. 1 is a flowchart illustrating an existing process for backing up a file system tree associated with a device being backed up. In the example shown, the backup process is a block based backup process. In block based backup, each file or other file system object is divided into or comprises of a plurality of data blocks and these data blocks are written to backup media. Data blocks for a given file are not necessarily stored together or contiguously in backup media and data blocks for different files may be intermingled on backup media. This is opposed to file based backup, where a file is stored as a single collection of information contiguously on backup media. In the event a given file is restored in a block based backup system, data blocks associated with that file are retrieved and used to restore the file to a restoration target.

Metadata is also stored during a block based backup and is retrieved and used during a restore.

At 100, a full block based backup is performed on an entire tree associated with a file system or a designated portion thereof, e.g., a sub-tree. In some embodiments, the on disk file system tree (or sub-tree) is traversed. At each file system node (e.g., directory, file, or other file system object), corresponding data blocks are identified and stored on backup media and associated metadata is stored. Metadata is derived, e.g., from data read from one or more blocks associated with the node. In some other embodiments, the on-disk file system tree is traversed only to generate metadata, while data blocks associated with the portion of the tree are collected using some other method, such as by using a file system bitmap, which identifies the used blocks in a file system.

Writes to primary (as opposed to backup) media, e.g., writes to a hard drive on which the file system and associated data are stored, are tracked at 102. In some embodiments, an agent or other process intercepts or is otherwise able to observe commands that are passed to a media driver, such as a disk driver, making it possible to keep track of which blocks have changed since a last full or other (e.g., incremental) backup.

At incremental backup, only those data blocks that have been written to since the last backup are stored on backup media and, in the typical prior art approach, metadata for the entire tree (e.g., file system tree or sub-tree) is obtained and stored at 104. For example, using the tracked writes, blocks that have been written to since the last backup (e.g., because an associated file or other file system object has been added, deleted, or modified) are written to backup media. Blocks that have not been written to (e.g., because an associated file system object did not change) since the last backup are not written to backup media. Metadata is generated or otherwise obtained for the entire tree (e.g., regardless of what has changed), to enable the file system (or a portion thereof) to be restored to a state associated with the incremental backup.

To restore the file system tree or sub-tree, or a file comprising the tree, to a state it was in at the time of the incremental backup, using the approach illustrated in FIG. 1 metadata generated and stored at the time of the incremental backup and, as applicable, blocks backed up at the time of the incremental backup and/or the full backup (or the chain of backups back to the most recent full back that preceded the incremental backup) on which the incremental backup was based are retrieved from backup media and used to perform the restoration.

Using the process shown in FIG. 1, performing an incremental backup at 104 may be dominated by obtaining and storing metadata. For example, it may take roughly 15 hours for a full block based backup (e.g., similar to step 100) of a high density file system (e.g., with tens or hundreds of millions of files) to be performed. Approximately 10 hours may be spent backing up data blocks and approximately 5 hours may be spent backing up metadata. A subsequent incremental backup (e.g., similar to step 104) may take over 5 hours. Approximately 15 minutes may be spent backing up the changed data blocks, which are relatively few in the case of a typical enterprise, and approximately 5 hours may be spent backing up metadata since all metadata is backed up regardless of what file system objects have changed and what changes there are to a hierarchy of a tree. Backing up only metadata for portions of the tree that have changed in state, rather than metadata for an entire tree, is disclosed.

Figure 2A:
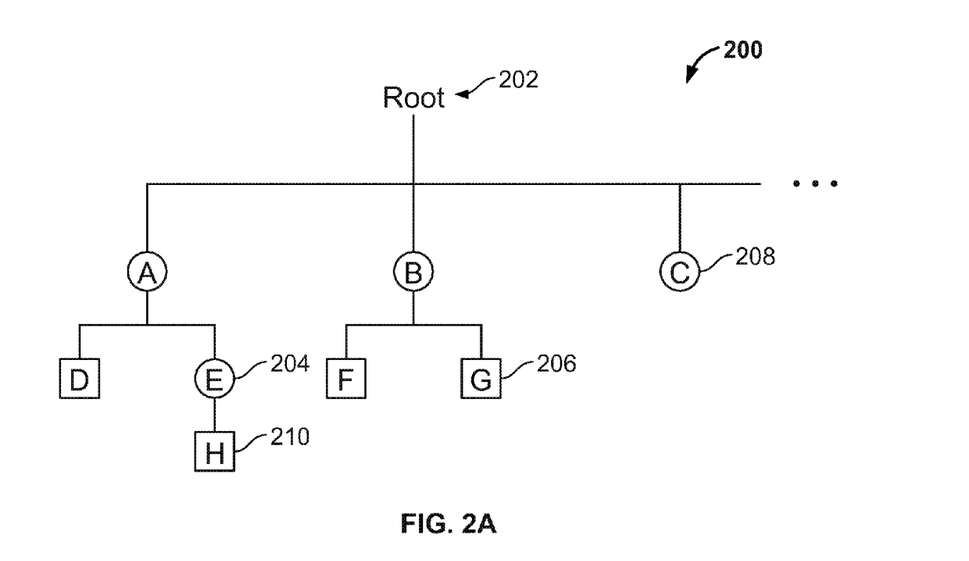
FIG. 2A is a diagram illustrating an embodiment of a tree on which a full block based backup is performed.

FIG. 2A is a diagram illustrating an embodiment of a tree on which a full block based backup is performed. In the example shown, tree 200 includes multiple file system objects with hierarchical relationships to each other. File system objects include files (illustrated as squares in tree 200) and directories (illustrated as circles in tree 200). A directory may include any number of files (including no files) and any number of directories (including no directories) as children. In this example, tree 200 has a single file system object (root 202) from which all other file system objects are descended.

Access to, modification of, and/or control over tree 200 typically occurs via a file system. A file system provides services, functionality, and/or operations for storing, locating, opening, creating, deleting, modifying, managing, and otherwise interacting with file system objects within a tree. There are a number of file systems available for a device to use. Typically, a file system is associated with a particular operating system. For example, some devices that run a Microsoft Windows operating system use New Technology File System (NTFS). Some devices that run a UNIX operating system use VERITAS file system (VxFS) or an open source file system, such as ZFS. In some applications, a device being backed up uses another file system besides these examples.

For each file system object in tree 200, associated data is stored in one or more blocks of physical storage media, e.g., on a disk drive or other storage. For example, file 206 is divided into a plurality of data blocks, each data block of which may correspond to a particular file offset within the file. Data blocks for a given file system object are not necessarily stored contiguously or otherwise together on media and data blocks associated with one file system object may be intermingled with data blocks of other file system objects on media.

Metadata is used by a file system to manage tree 200 and/or specific file system objects within it. For example, some file systems use metadata to track which blocks are associated with a particular file system object, where those blocks are located on media, etc. In some applications, metadata includes relationship and/or hierarchy related information associated with tree 200. For example, metadata may include the parent of a given file system object, the children of a given file system object (if any), the file size, file permissions, etc. Typically, a block based backup application will back up blocks containing metadata about file system objects, in addition to those that contain data comprising the file system objects themselves. Blocks that are associated with metadata are sometimes referred to herein as "file system metadata blocks," referring to the inode data structure used typically in Unix file systems to track file system objects and structure. Blocks that comprise a given file system object (e.g., include the contents of a file) are sometimes referred to herein as "data blocks." Since a file system uses metadata, both data blocks and file system metadata blocks are backed up and written to backup media where they are stored to be used at a restoration, if any.

A full block based backup is performed on tree 200 in the state shown in FIG. 2A. In block based backup, data blocks and metadata are (for example) retrieved from a device being backed up and/or generated by a backup process or agent. This information is written to backup media. In a full block based backup, all data blocks and metadata associated with the current state of a tree are backed up (e.g., regardless of the changes since a prior backup, if any).

Figure 2B:
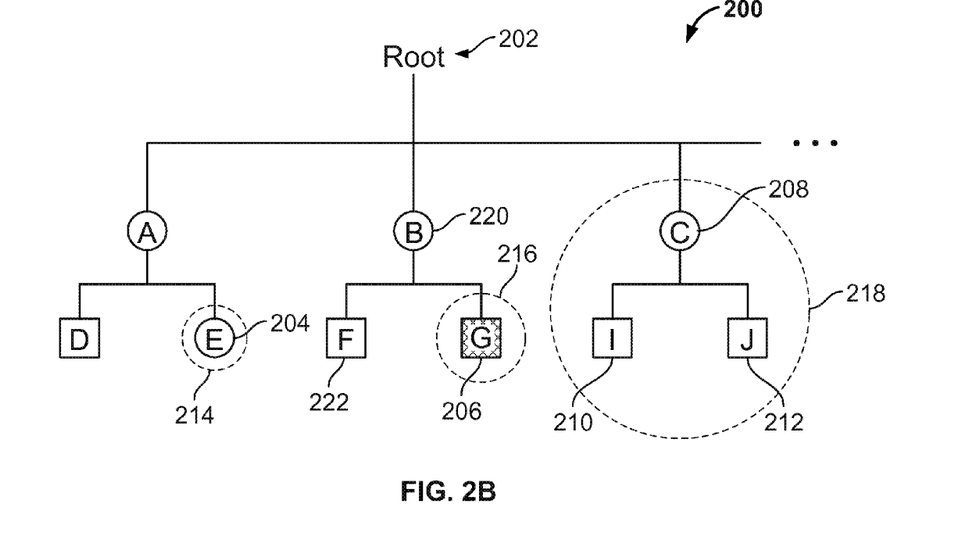
FIG. 2B is a diagram illustrating an embodiment of a tree for which only incremental metadata is obtained and backed up.

FIG. 2B is a diagram illustrating an embodiment of a tree for which only incremental metadata is obtained and backed up. In the example shown, the state of tree 200 has changed since the example of the above figure. Certain file system objects in tree 200 have been modified since FIG. 2A and the hierarchy of tree 200 has changed since FIG. 2A. File 210 has been deleted from directory 204, file 206 has been modified, and files 210 and 212 have been added to directory 208.

Generating and storing only incremental metadata during an incremental backup in a block based backup environment is disclosed. Incremental metadata is defined to be metadata associated with one or more portions of a tree that have changed in state since a prior backup. A portion may include any number of files, directories, or other file system objects. Metadata associated with a portion of a tree that has not changed (e.g., file system objects in those portions are unchanged and the hierarchy associated with those portions are the same) in some embodiments is not included in "incremental metadata". Changes in a tree may include: a newly created file, a deleted file, a new directory, a file with additional or removed content, a file system object with new permissions, etc. In the example shown in FIGS. 2A and 2B, for example, incremental metadata would include in some embodiments, for an incremental backup performed at a time corresponding to FIG. 2B after a full backup performed at a time corresponding to FIG. 2A, metadata only for portions 214, 216, and 218, since those portions of tree 200 that have changed since the prior backup associated with FIG. 2A. Metadata associated with the rest of tree 200 (e.g., file 222 which has not changed) is not collected, or generated, or otherwise obtained, and/or is not written to backup media. Generating and storing only incremental metadata (as opposed to metadata for an entire tree) typically will reduce the amount of time associated with incremental backup for a block based backup system.

In some embodiments, to determine at the time of an incremental backup the portion(s) of a tree that have changed since a last full backup, a (e.g., metadata) snapshot associated with the state of a tree is recorded when a full backup is performed. For example, a snapshot is taken when a full block based backup is performed on tree 200 in the state shown in FIG. 2A. In some embodiments, at a subsequent incremental backup, the snapshot of the file system created and stored at the time of the previous (e.g., full) backup and the list of changed blocks to be backed up in the incremental backup are used, as described more fully below, to identify those portions of the file system tree that have changed. Incremental metadata related only to those changed portions is generated and stored at the time of incremental backup. To restore the file system or a portion thereof to a state associated with an incremental backup, the snapshot taken at the full backup and the incremental metadata are used, as applicable/required, to perform the restore operation.

Figure 3:
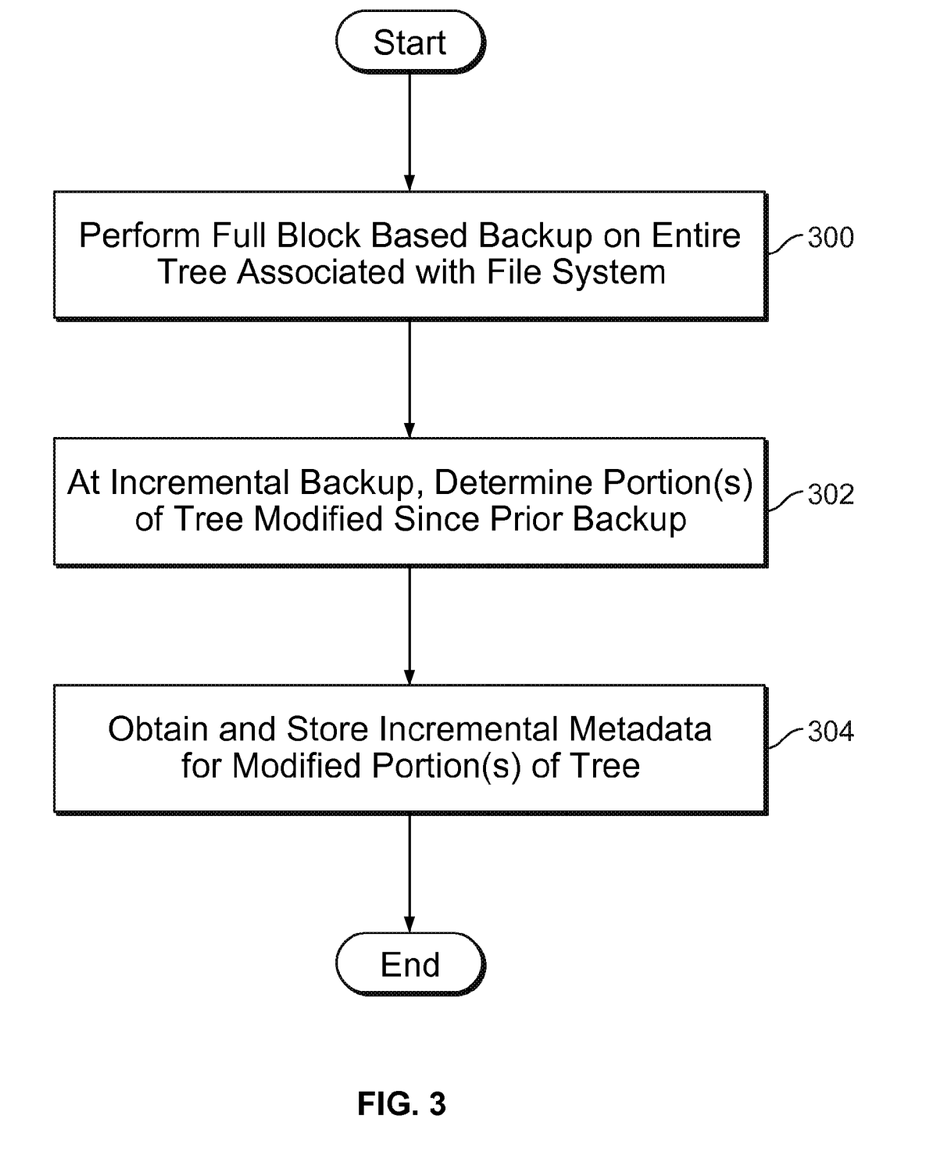
FIG. 3 is a flowchart illustrating an embodiment of a process for backing up data in a block based backup environment, including generating and storing incremental metadata at an incremental backup.

FIG. 3 is a flowchart illustrating an embodiment of a process for backing up data in a block based backup environment, including generating and storing incremental metadata at an incremental backup. In this example (and examples illustrated in other figures), backing up data blocks may not necessarily be discussed. Although not necessarily mentioned, any appropriate process for backing up data blocks may be used in combination with the illustrated process for generating and storing metadata. In some embodiments, some of the techniques disclosed herein for generating and storing incremental metadata are included or otherwise incorporated into a single block based backup process or entity that backs up metadata and data blocks. In some embodiments, some steps illustrated herein are repeated to perform any desired sequence of full backups and/or incremental backups. For example, based on a user's selection or the settings received from an automatic backup process, either a full or incremental backup may be triggered.

A full block based backup is performed on an entire tree associated with a file system (or portion thereof) at 300. In some embodiments, metadata is retrieved or otherwise obtained from media (e.g., a magnetic disk of a device being backed up) without interacting with or using a file system interface. In some embodiments, the tree is crawled or traversed by directly accessing the disk image, and for each file system object in the tree, metadata for that object is generated or otherwise obtained and stored. In some embodiments, a file system stores metadata as file system metadata blocks on media (e.g., associated with a device being backed up), and in 300 metadata is read, e.g., by an backup application, agent, or process, from such file system metadata blocks and stored for later use, if required, in performing a restore operation. A block based backup process in some embodiments obtains these file system metadata blocks from media and writes metadata read and/or derived therefrom to a metadata file or other data store.

At incremental backup, portion(s) of a tree modified since a prior backup are determined at 302. For example, the prior backup may be the full block based backup performed at 300. In some scenarios, a modified portion of a tree includes a portion where the hierarchy of the tree has not changed (i.e., no files or directories were added or deleted) but one of the file system objects in that portion (e.g., a file) has changed, for example properties of the file have changed, content has been added or deleted, etc.

In some embodiments, a changed block list generated by intercepting write commands to a media driver is used in determining portion(s) of a tree that have changed. For example, the changed block list may be similar to that used in 102 to track writes to media. In some embodiments, a node (where the node's location in the hierarchy of a tree is not necessarily known at this time) is determined or otherwise detected to have been changed, and the hierarchical path of the node is traced or otherwise determined in a upwards manner. In some embodiments, alternative techniques are used to determine changed portion(s) of a tree besides using a changed block list.

At 304, incremental metadata for modified portion(s) of a tree are obtained and stored. In some embodiments, file system metadata blocks associated with portion(s) of a tree that have changed are retrieved from media of a device being backed up and metadata is read and/or derived therefrom.

In some embodiments, determining changed portion(s) of a tree at 302 and obtaining and storing incremental metadata at 304 overlap or are related to some degree. For example, in some embodiments, in the process of determining portion(s) of a tree that have changed includes obtaining new and/or changed metadata. In some embodiments, it is not necessary to determine all changed portions at 302 before obtaining and backing up at 304 begins. For example, while incremental metadata is being obtained and backed up for one changed portion of a tree, another changed portion of the tree is being determined simultaneously.

In some embodiments, it is determined at an incremental backup whether to generate and store incremental metadata or metadata for an entire tree. For example, in some applications or scenarios there may be little benefit to generating and storing only incremental metadata at an incremental backup. In some embodiments, an estimated or approximated amount of time saved is used in determining whether to backup incremental metadata. In some embodiments if less than 10%-30% of a tree has changed in state, incremental metadata is backed up at an incremental backup. Otherwise, if a relatively large percentage of a tree has changed, metadata for the entire tree is backed up, thereby saving the consumption of time and processing resources associated with determining which portions of the tree have changed. Trees with certain types of hierarchies may also experience less of an improvement in backup times compared to other trees. For example, trees with relatively few child directories under a root and millions of files in each child directory may not have a significant improvement in time when incremental metadata is backed up. A decision to back up incremental metadata may be based on tree characteristics, such as the number of levels of hierarchy, a representative (e.g., average) number of children per directory, the number of children immediately below a root directory, the number of children in each direct child of a root directory, etc.

In some embodiments, incremental metadata includes some metadata that is associated with a portion of a tree or a file system object that has not changed. For example, in some embodiments, multiple changed portions of a tree are combined into a single changed portion. In the process of combining two changed portions (e.g., a first child and a second child of a given directory) there may be some unchanged file system object included in a combined portion. Backing up incremental metadata that includes some unchanged metadata or metadata that is associated with an unchanged file system object in some embodiments is easier to implement, still has sufficient performance, etc.

Figure 4:
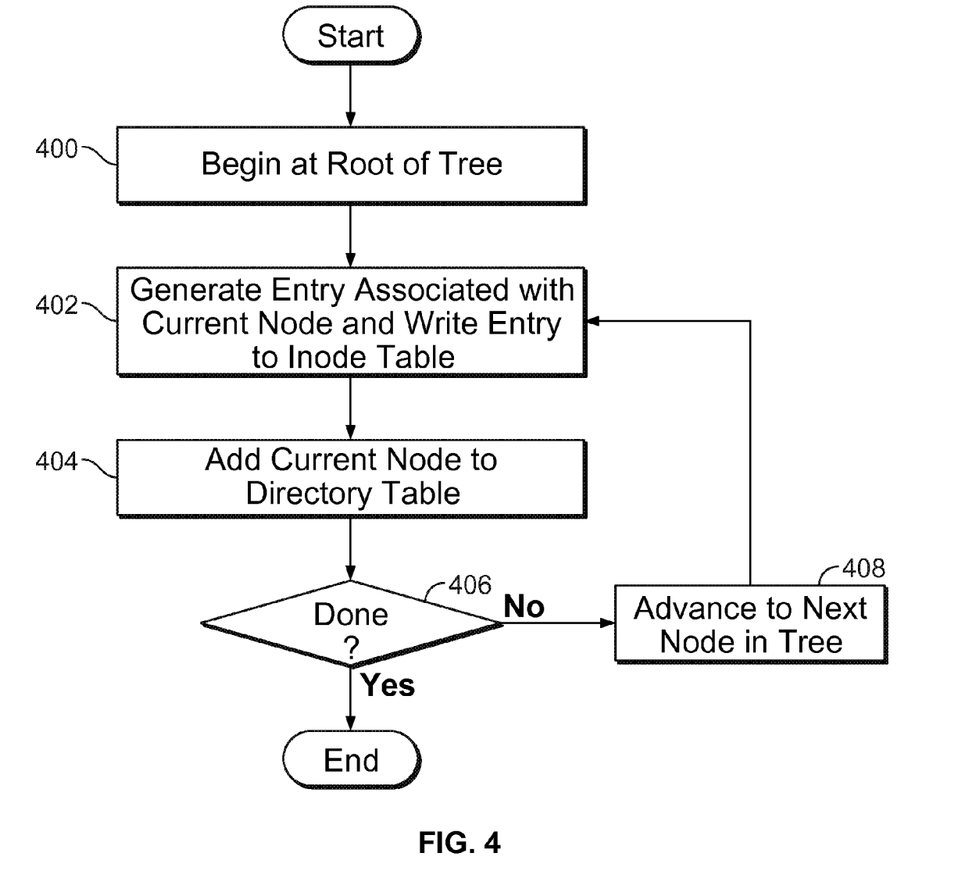
FIG. 4 is a flowchart illustrating an embodiment of a process for generating an inode table and a directory table at a full backup.

FIG. 4 is a flowchart illustrating an embodiment of a process for generating an inode table and a directory table at a full backup. In the example shown, an inode table and directory table are generated and saved at a full backup. In some embodiments, this information is kept on disk cache for quick access and may be retrieved at a subsequent incremental backup and used to determine portion(s) of a tree that have changed and/or locate, generate, or otherwise obtain incremental metadata associated with such changed portions. Information is recorded based on the state of file system objects in the tree (e.g., permissions at the time, sizes at that time, etc.) as well as the hierarchy of the tree at that time (i.e., at the time of the full backup). This is one technique for taking a snapshot of a tree in its state at the time of the full backup; in some embodiments other techniques are used.

The process begins at 400 at a root of a tree. For example, root 202 of tree 200 is the root node in the example of FIG. 2A. At 402, an entry associated with a current node is generated and written to an inode table. Since the current node is the root of a tree, an entry for the root is generated. In some embodiments, entries in an inode table are organized or accessed based on inode number (e.g., as opposed to the name of a file or directory). In some embodiments, an inode entry (and consequently an inode table) includes size (e.g., in bytes), associated permissions (e.g., readable, writeable, etc.), data block locations (e.g., location(s) of data blocks on physical media used to construct a file system object), file offsets associated with the data blocks, file system metadata block location, immediate children (if any), and/or a parent associated with that inode entry.

At 404, a current node is added to a directory table. A directory table may record the hierarchy of a tree at a particular time. Using a directory table, the entire structure of a tree may be reconstructed or otherwise determined. In some embodiments, a directory table includes inode number of the node/directory and a list (e.g., name and inode) of its children. In some embodiments, a directory table does not necessarily include the name of the node/directory itself.

At 406 it is determined whether all nodes have been processed. If not, the process advances to a next node in a tree at 408. The next node may be selected or determined in any appropriate manner.

The directory table and inode table generated in this process may be used as a snapshot (at the inode and/or block level) of the hierarchy of a tree and the state of file system objects in a tree at the time of a full backup. To determine portion(s) of a tree that have changed, the recorded directory table and inode table may be retrieved at the time of an incremental backup. The directory table and inode table include different information and in some embodiments are used to determine different types of changes to a tree. In some embodiments, a directory table is used to detect a change in the hierarchy of a tree (e.g., node added/deleted) and in some embodiments an inode table is used to detect a change in the state of a file system object (e.g., inode modified), such as a file with content added to it. In one example of how a directory table and an inode table may be used, the hierarchy of a tree remains the same between a full backup and an incremental backup. That is, no files or directories were added to or deleted from a tree. In some embodiments, in that scenario no change to the hierarchy would be determined or detected using a directory table generated and saved at a full backup. However, if some file within that tree has changed, in some embodiments the changed file would be detected or otherwise determined by the entry in the saved inode table that corresponds to that file. For example, the properties of the file may be different, the sizes of the files may be different, the file system metadata blocks may have a different locations, etc.

Figure 5:
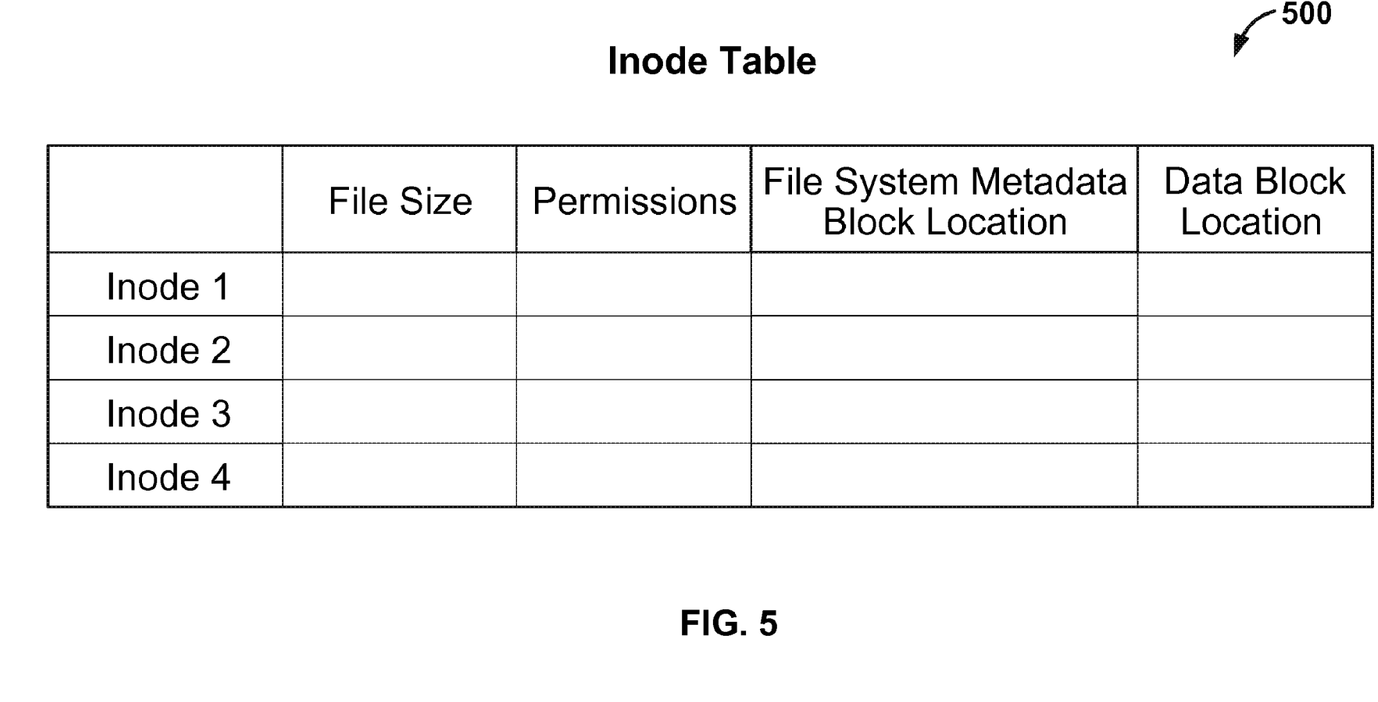
FIG. 5 is a diagram illustrating an embodiment of an inode table.

FIG. 5 is a diagram illustrating an embodiment of an inode table. In the example shown, inode table 500 may generated and saved at a full backup. Mode table 500 may be retrieved at an incremental backup and used to determine portions of a tree that have changed.

Inode table 500 includes entries for each inode in a tree; the information recorded in a given entry in inode table 500 is based on the state of that inode at the time inode table 500 was generated, for example at a full backup. In some embodiments an inode table is indexed or otherwise accessed based on inode number (e.g., as opposed to other identifiers or references, such as a name). In the example shown in FIG. 5, an inode entry includes file size, permissions, file system metadata block location, and data block location(s). The file system metadata block location is the location, address or offset on media where a file system metadata block associated with a particular inode is stored. The data block location(s) are the locations, address, or offset on media where the data blocks that comprise a file or other files system object associated with an inode are located. In some embodiments, additional and/or alternative information is included in inode table 500. For example, in some embodiments the parent and/or children of an inode are included in inode table 500.

Figure 6:
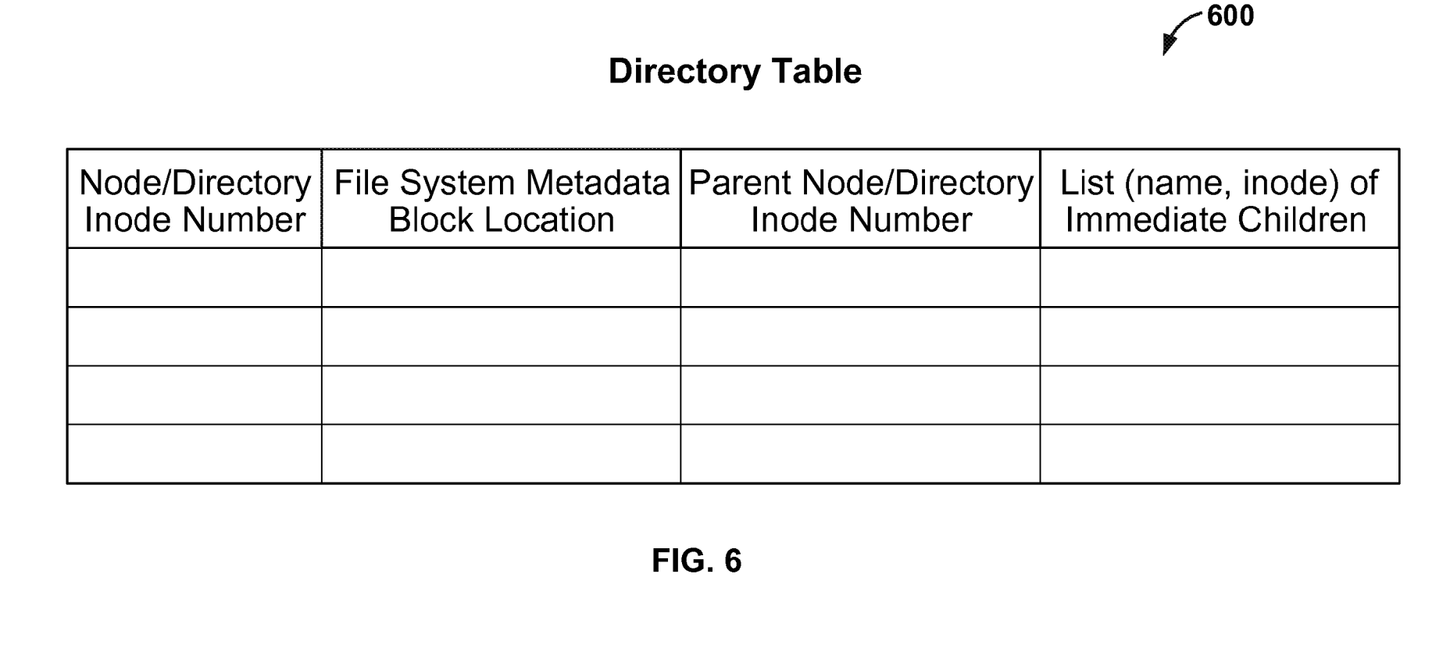
FIG. 6 is a diagram illustrating an embodiment of a directory table.

FIG. 6 is a diagram illustrating an embodiment of a directory table. In some embodiments, directory table 600 is generated and stored at a full backup. A stored directory table is retrieved at an incremental backup from on-disk cache and used to determine portion(s) of a tree that have changed since a full backup.

Directory table 600 includes node/directory inode number, file system metadata block location, parent node/directory inode number and a list (including name and inode) of immediate children. In some embodiments, there is an entry for each node/directory in a tree and a directory table describes the hierarchy of a tree at a certain time. In some embodiments, the file system metadata block location in directory table 600 is a location or offset on (e.g., physical) media at which a file system metadata block is stored. In some embodiments, the inode number of a particular node/directory included in directory table 600 corresponds to the inode number by which an entry in inode table 500 is indexed or accessed. In this example, directory table 600 does not necessarily describe the state of individual file system objects (e.g., permissions, size, etc.).

Inode table 500 and directory table 600 are examples of information generated and stored in order to be able to subsequently determine portions of a tree that have changed and/or to generate or obtain incremental metadata associated with those changed portions. In some embodiments, a single table is used. In some embodiments, alternative or additional information is included in directory table 600 or inode table 500. In some embodiments, the list of immediate children is optional/not included and/or the parent of a given file system object is/are included in a directory table or an inode table. Including children/parents may enable top-down/bottom-up determination of the hierarchy of a tree. For example, in some cases including a list of immediate children in a directory table or other table facilitates top down traversing of a file system tree from any node in the tree.

Figure 7A:
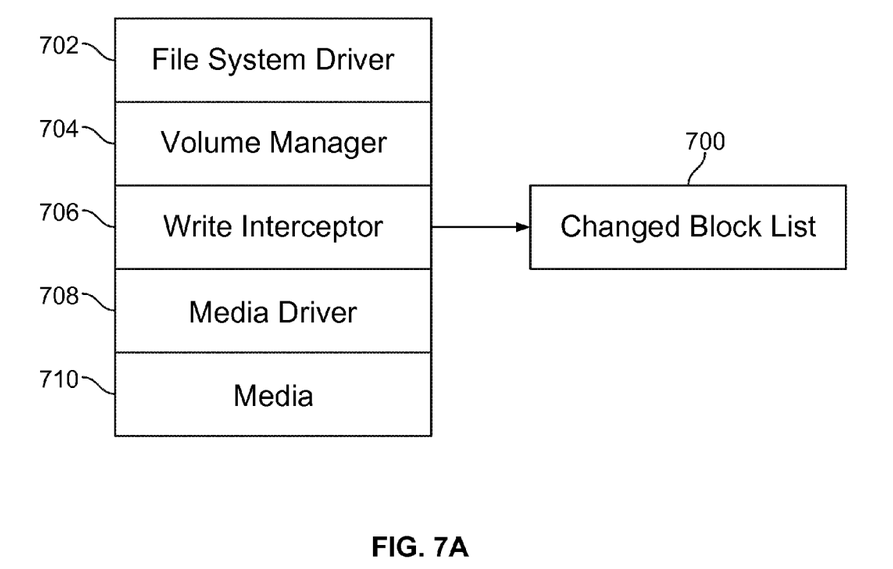
FIG. 7A is a diagram illustrating an embodiment of a write interceptor that generates a changed block list.

FIG. 7A is a diagram illustrating an embodiment of a write interceptor that generates a changed block list. In the example shown, changed block list 700 is used in some embodiments to determine portion(s) of a tree that have changed (e.g., since a prior backup). In some embodiments, changed block list 700 is cleared or reset at certain times. For example, changed block list 700 in some embodiments is cleared after a full backup is performed, so that a changed block list reflects events since the full backup.

Write interceptor 706 generates changed block list 700 based on intercepted commands passed to it. Write interceptor 706 is placed between volume manager 704 and media driver 708 and is able to observe writes or other commands as they are passed between volume manager 704 and media driver 708. Media driver 708 receives writes or other commands and based on the commands modifies blocks (is so instructed) stored on media 710. In some block based systems, file system metadata blocks and data blocks are stored on 710 and changed block list 700 may include changes to data blocks and/or file system metadata blocks.

In some embodiments, write interceptor 706 is operational any time a device being backed up is running or operational. This permits write interceptor 706 to examine all commands that are passed between volume manager 704 and media driver 708. For example, any time a user or an application creates a new directory, deletes a file, adds content to a file, etc. write interceptor 706 receives corresponding calls to modify blocks associated with that file or directory and records the changed blocks in changed block list 700. Not all commands intercepted by write interceptor 706 will necessarily cause an entry to be added to changed block list 700. For example, reading a file may cause commands to be passed between volume manager 704 and media driver 708, but there may be no information added to changed block list 700.

In some embodiments, write interceptor 706 is typically not installed on a device. For example, a device that has just been added/installed may not necessarily have write interceptor 706 intercepting its write operations. In some embodiments, write interceptor 706 is associated with a backup/recovery related product and is installed on a device when other backup and/or recovery related agents, applications, or processes are installed.

Figure 7B:
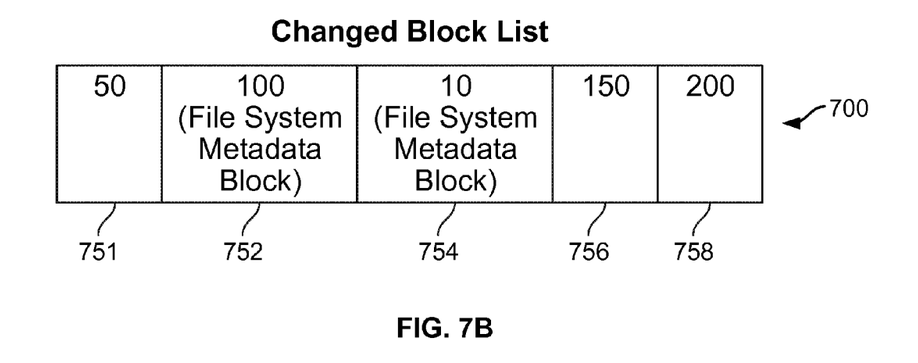
FIG. 7B is a diagram illustrating an embodiment of a changed block list.

FIG. 7B is a diagram illustrating an embodiment of a changed block list. In the example shown, changed block list 700 contains the locations or offsets on media of blocks that have been changed (e.g., created blocks, deleted blocks, modified blocks, etc.). In some embodiments, changed block list 700 is used to determine portion(s) of a tree that have changed since a prior backup (e.g., a hierarchy of a tree has changed and/or a file system object has changed). Some file systems store both data blocks and file system metadata blocks on media and in this example changed block list 700 includes changes to data blocks and changes to file system metadata blocks. In some embodiments, a different collection of information is recorded and/or information is organized in another manner. For example, in some embodiments two lists are maintained, one for changed data blocks and one for changed file system metadata blocks.

Entries 752 and 754 are associated file system metadata blocks and their inclusion in changed block list 700 indicates that those file system metadata blocks have changed. In some embodiments, changed block list 700 is examined or parsed at an incremental backup to determine portion(s) of a tree that have changed since a prior backup and/or obtain incremental metadata associated with a changed portion of a tree. For example, in some embodiments changed block list 700 is compared to the list of file system metadata block locations in the directory table 600 and/or the file system metadata blocks listed in inode table 500. In the example shown, it has been determined that entries 752 and 754 are associated with file system metadata blocks. Using entries 752 and 754 and corresponding data in directory table 600 and/or inode table 500, as applicable, in some embodiments it is determined where in the tree hierarchy those file system metadata blocks correspond to and thus what portion(s) of a tree have changed.

In some embodiments, some changed block list is already generated by current block based backup systems. For example, when tracking writes to media at 102, in some embodiments, a changed block list is generated. If needed, the information recorded in changed block list 700 may be augmented or supplemented to support generating and storing incremental metadata at an incremental backup.

Some devices may have a virtual file system (VFS) and obtaining a changed block list and/or the information included in a changed block list may vary from the example described above. For example, UNIX devices have a VFS. In some embodiments where a VFS is used, a write interceptor interfaces with or otherwise operates additionally at a virtual file system layer. A virtual file system layer may operate between a kernel and a concrete file system on a device. In some embodiments, a changed block list generated in a VFS environment includes inode numbers along with block locations to provide the mapping between the file or directory and the block which is recorded or captured. Subsequent processing of a changed file list is modified, if needed, to use this additional information of the inode numbers associated with the block locations. For example, in some embodiments there is a step of mapping a block location that is recorded in some changed block lists to inode number. This step may be avoided in embodiments where a changed block list includes inode number instead of block location.

In some embodiments, journals or logs generated by a file system are used in addition to or as an alternative to a changed block list in determining changed portion(s) of a tree. For example, some devices that are backed up use VxFS as their file system. With VxFS, journaling is provided and a list of log files that have changed and corresponding time stamps may be obtained. This list of log files may be used in determining portion(s) of a tree that have changed and/or in generating or obtaining incremental metadata associated with those changed portion(s).

Figure 8:
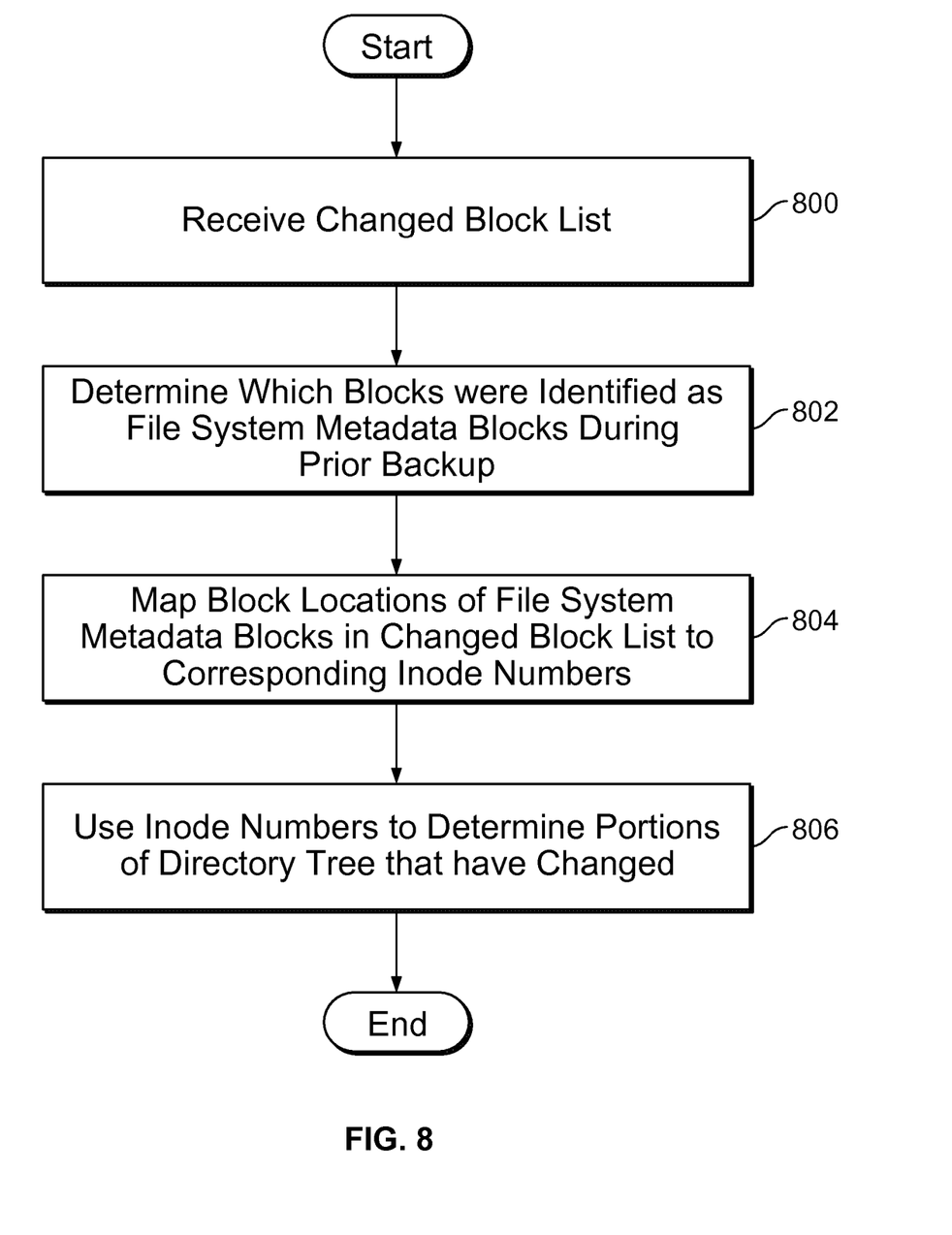
FIG. 8 is a flowchart illustrating an embodiment of a process for determining portion(s) of a tree that have changed using a changed block list.

FIG. 8 is a flowchart illustrating an embodiment of a process for determining portion(s) of a tree that have changed using a changed block list. In some embodiments, the illustrated process is performed at an incremental backup.

A changed block list is received at 800. In this embodiment, a changed block list is cleared or reset at a prior backup (e.g., a full backup) and includes block locations on media of blocks (e.g., including file system metadata blocks and data blocks) that have been changed.

At 802, it is determined which blocks were identified as file system metadata blocks during a prior backup. This may be determined using a variety of information that was recorded at the prior backup. In some embodiments, 802 includes first comparing the change block list to the list of file system metadata block locations in a directory table such as directory table 600, to identify directories/sub-directories that existed at the time of the last full backup and have had child nodes added/deleted since the last full backup, and comparing the changed block list to the list of file system metadata block locations in an inode table such as inode table 500, to identify file system objects that have been modified since the last full backup.

Block locations of file system metadata blocks in a changed block list are mapped to corresponding inode numbers at 804. In some embodiments, mapping from block location to inode number at 804 is not needed. For example, if a changed block list is generated in a VFS environment, a changed block list may include inode numbers associated with the block locations and mapping at 804 is not performed.

At 806, inode numbers are used to determine portion(s) of a tree that have changed. In some embodiments, an inode table is consulted. In some embodiments, the inode table records the state of inodes in a tree at the time the inode table was generated (e.g., at a full backup). If an inode entry corresponding to a changed file system metadata block (e.g., from a changed block list) is found in such an inode table, the inode existed at the full backup but has changed since then. Using the corresponding inode entry, it may be determined whether the changed file system metadata block corresponds to a directory or a file. In some embodiments, if the changed file system metadata block corresponds to a file then only incremental metadata for that file will be obtained and stored. In some embodiments, if a changed file system metadata block corresponds to a directory, incremental metadata for that directory and its immediate children will be obtained and stored. In some embodiments, incremental metadata for that directory and all of its children (to the lowest level of hierarchy) will be obtained and stored. In some embodiments, incremental metadata is obtained at least in part by interacting with the file system, e.g., "walking" those portions of the file system associated with changed file system metadata blocks determined as described above.

In some cases, an inode entry will not be found in an inode table generated at a prior backup because the inode that corresponds to a changed file system metadata block did not exist at the time of the prior backup. In some embodiments, this is handled indirectly by tracing or determining the hierarchical path of a new inode and determining the node or juncture at which new inode joins an unchanged portion of a tree which registered a change and therefore showed up as a changed portion of the file system tree. A walk down that node captures all newly created entities. In some embodiments, a directory table generated at a prior (e.g., full) backup is used to determine the hierarchy of a tree at the time of the prior backup. In some embodiments, current metadata associated with a new inode is obtained from media to determine the hierarchical path of the new inode in a bottom-up manner and where the new branch joins the hierarchy of a tree. For example, in some embodiments, a superblock is retrieved from media of a device. The superblock may be examined, and subsequent information (and its location on media) may be determined and obtained. This process may continue until appropriate metadata that may be used to determine the hierarchical path of a new inode and/or where a new branch joins a tree is obtained.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing an incremental block-based backup, comprising: using a processor to record that during a prior backup one or more metadata block locations contained file system metadata associated with a file system tree as opposed to data associated with the file system tree, including grouping the recorded metadata block locations according to nodes in the file system tree and recording with each recorded metadata block location (1) a unique identifier corresponding to that node and (2) a unique identifier corresponding to a parent node of that node;

obtaining a list of changed block locations, wherein the list of changed block locations comprises a list of entries, including at least one changed data block location entry and at least one changed metadata block location entry, and wherein the at least one changed data block location entry stores a location at which a data block that has changed since the prior backup is located, and wherein the at least one changed metadata block location entry stores a location at which file a system metadata block that has changed since the prior backup is located, and wherein the inclusion of each changed data block location entry or each changed metadata block location entry on the list indicates that the block corresponding to the entry has been changed since the prior backup;

using the processor to compare the recorded metadata block locations and the list of changed block locations in order to determine those block locations in the list of changed block locations which contained file system metadata during the prior backup;

determining a changed portion of the file system tree that has changed since the prior backup based at least in part on those block locations in the list of changed block locations which contained file system metadata during the prior backup, including mapping at least one of those block locations and mapping the corresponding node in the file system tree to a parent node of the corresponding node;

obtaining incremental metadata for the changed portion of the file system tree; and storing the incremental metadata in storage, wherein there is at least some file system metadata associated with an unchanged portion of the file system tree that is not stored.

2. The method of claim 1, wherein the prior backup includes a full backup.

3. The method of claim 1, wherein obtaining includes using a write interceptor configured to receive one or more commands from a volume manager and to pass the one or more commands received from the volume manager to a media driver.

4. The method of claim 1, wherein using the processor to record includes traversing the file system tree beginning at a root node of the file system tree.

5. The method of claim 1, wherein mapping the corresponding node in the file system tree to the parent node of the corresponding node is performed recursively until a root node of the file system tree is reached to obtain a file system path.

6. The method of claim 1, wherein:
recording with each recorded metadata block location further includes recording (3) unique identifiers corresponding to all child nodes of that node; and
determining further includes identifying those nodes that existed in the file system tree during the prior backup and have had child nodes added or deleted since the prior backup.

7. The method of claim 1, wherein:
determining includes determining, for at least one of the those block locations in the list of changed block locations which contained file system metadata during the prior backup, whether the at least one block location is associated with a file or a directory; and
obtaining incremental metadata includes:
in the event the at least one block location is determined to be associated with a file, obtaining file system metadata for the file; and
in the event the at least one block location is determined to be associated with a directory, obtaining file system metadata for the directory and the directory's children to a lowest level of hierarchy.

8. The method of claim 7, wherein obtaining file system metadata for the directory and the directory's children to a lowest level of hierarchy includes traversing at least a portion of the file system tree.

9. A system for performing an incremental block-based backup, comprising:
a processor; and
a memory coupled with the processor, wherein the memory is configured to provide the processor with instructions which when executed cause the processor to:
record that during a prior backup one or more metadata block locations contained file system metadata associated with a file system tree as opposed to data associated with the file system tree, including grouping the recorded metadata block locations according to nodes in the file system tree and recording with each recorded metadata block location (1) a unique identifier corresponding to that node and (2) a unique identifier corresponding to a parent node of that node;
obtain a list of changed block locations, wherein the list of changed block locations comprises a list of entries, including at least one changed data block location entry and at least one changed metadata block location entry, and wherein the at least one changed data block location entry stores a location at which a data block that has changed since the prior backup is located, and wherein the at least one changed metadata block location entry stores a location at which a file system metadata block that has changed since the prior backup is located, and wherein the inclusion of each changed data block location entry or each changed metadata block location entry on the list indicates that the block corresponding to the entry has been changed since the prior backup;
compare the recorded metadata block locations and the list of changed block locations in order to determine those block locations in the list of changed block locations which contained file system metadata during the prior backup;
determine a changed portion of the file system tree that has changed since the prior backup based at least in part on those block locations in the list of changed block locations which contained file system metadata during the prior backup, including mapping at least one of those block locations and mapping the corresponding node in the file system tree to a parent node of the corresponding node;
obtain incremental metadata for the changed portion of the file system tree; and
store the incremental metadata in storage, wherein there is at least some file system metadata associated with an unchanged portion of the file system tree that is not stored.

10. The system of claim 9, wherein the instructions for recording cause the processor to traverse the file system tree beginning at a root node of the file system tree.

11. The system of claim 9, wherein the instructions for mapping cause the processor to map the corresponding node in the file system tree to the parent node of the corresponding node recursively until a root node of the file system tree is reached to obtain a file system path.

12. The system of claim 9, wherein:
the instructions for recording with each recorded metadata block location further include instructions which cause the processor to record (3) unique identifiers corresponding to all child nodes of that node; and
the instructions for determining further include instructions which cause the processor to identify those nodes that existed in the file system tree during the prior backup and have had child nodes added or deleted since the prior backup.

13. The system of claim 9, wherein:
the instructions for determining further include instructions which cause the processor to determine, for at least one of the those block locations in the list of changed block locations which contained file system metadata during the prior backup, whether the at least one block location is associated with a file or a directory; and
the instructions for obtaining incremental metadata include instructions which cause the processor to:
in the event the at least one block location is determined to be associated with a file, obtain file system metadata for the file; and
in the event the at least one block location is determined to be associated with a directory, obtain file system metadata for the directory and the directory's children to a lowest level of hierarchy.

14. A computer program product for performing an incremental block-based backup, the computer program product being embodied in a non-transitory computer readable storage medium and comprising computer instructions for:
recording that during a prior backup one or more metadata block locations contained file system metadata associated with a file system tree as opposed to data associated with the file system tree, including grouping the recorded metadata block locations according to nodes in the file system tree and recording with each recorded metadata block location (1) a unique identifier corresponding to that node and (2) a unique identifier corresponding to a parent node of that node;
obtaining a list of changed block locations, wherein the list of changed block locations comprises a list of entries, including at least one changed data block location entry and at least one changed metadata block location entry, and wherein the at least one changed data block location entry stores a location at which a data block that has changed since the prior backup is located, and wherein the at least one changed metadata block location at which a file system metadata block that has changed since the prior backup is located, and wherein the inclusion of each changed data block location entry or each changed metadata block location entry on the list indicates that the block corresponding to the entry has been changed since the prior backup;

comparing the recorded metadata block locations and the list of changed block locations in order to determine those block locations in the list of changed block locations which contained file system metadata during the prior backup;

determining a changed portion of the file system tree that has changed since the prior backup based at least in part on those block locations in the list of changed block locations which contained file system metadata during the prior backup, including mapping at least one of those block locations and mapping the corresponding node in the file system tree to a parent node of the corresponding node;

obtaining incremental metadata for the changed portion of the file system tree; and storing the incremental metadata in storage, wherein there is at least some file system metadata associated with an unchanged portion of the file system tree that is not stored.

15. The computer program product of claim 14, wherein mapping the corresponding node in the file system tree to the parent node of the corresponding node is performed recursively until a root node of the file system tree is reached to obtain a file system path.

16. The computer program product of claim 14, wherein:
the computer instructions for recording with the recorded metadata block locations which are grouped according to nodes in the file system tree further include computer instructions for recording (3) unique identifiers corresponding to all child nodes of that node; and the computer instructions for determining further include computer instructions for identifying those nodes that existed in the file system tree during the prior backup and have had child nodes added or deleted since the prior backup.

17. The computer program product of claim 14, wherein:
the computer instructions for determining include computer instructions for determining, for at least one of the those block locations in the list of changed block locations which contained file system metadata during the prior backup, whether the at least one block location is associated with a file or a directory; and the computer instructions for obtaining incremental metadata include computer instructions for:
in the event the at least one block location is determined to be associated with a file, obtaining file system metadata for the file; and
in the event the at least one block location is determined to be associated with a directory, obtaining file system metadata for the directory and the directory's children to a lowest level of hierarchy.

18. The computer program product of claim 17, wherein the computer instructions for obtaining file system metadata for the directory and the directory's children to a lowest level of hierarchy include computer instructions for traversing at least a portion of the file system tree.

* * * * *